United States Patent
Hull

(10) Patent No.: US 10,351,265 B1
(45) Date of Patent: Jul. 16, 2019

(54) ROTATING GIMBAL SYSTEM

(71) Applicant: The United States of America as Represented by the Adminstrator of NASA, Washington, DC (US)

(72) Inventor: Patrick V. Hull, Brownsboro, AL (US)

(73) Assignee: The United States of America as represented by the Administrator of NASA, Washington, DC (US)

( * ) Notice: Subject to any disclaimer, the term of this patent is extended or adjusted under 35 U.S.C. 154(b) by 427 days.

(21) Appl. No.: 15/346,991

(22) Filed: Nov. 9, 2016

(51) Int. Cl.
*B64G 1/28* (2006.01)
*G05D 1/08* (2006.01)

(52) U.S. Cl.
CPC ............ *B64G 1/28* (2013.01); *G05D 1/0883* (2013.01)

(58) Field of Classification Search
CPC .................... B64G 1/28; G05D 1/0883
See application file for complete search history.

(56) References Cited

U.S. PATENT DOCUMENTS

| | | | |
|---|---|---|---|
| 4,324,378 A * | 4/1982 | Groutage | F16M 11/10 248/184.1 |
| 4,375,878 A | 3/1983 | Harvey et al. | |
| 4,458,426 A | 7/1984 | O'Connor et al. | |
| 5,124,938 A * | 6/1992 | Algrain | B64G 1/22 248/550 |
| 6,386,886 B1 | 5/2002 | Filaretos | |
| 6,531,990 B2 | 3/2003 | Verkerk | |
| 6,789,437 B2 | 9/2004 | Wyse | |
| 6,859,188 B1 | 2/2005 | Matthews et al. | |
| 6,957,020 B2 | 10/2005 | Johnson et al. | |
| 8,184,059 B2 | 5/2012 | Bunch et al. | |
| 2007/0050139 A1* | 3/2007 | Sidman | F16M 11/041 318/649 |

OTHER PUBLICATIONS

CubeSat Size 3 DOF, High Accuracy, High Reliability Gimbal, COBRA Gimbal, Tethers Unlimited, Inc. Bothell, WA USA.

* cited by examiner

*Primary Examiner* — Muhammad S Islam
(74) *Attorney, Agent, or Firm* — James J. McGroary; Mark P. Dvorscak

(57) ABSTRACT

A gimbal system includes a stationary base with a first motor being coupled thereto. A rotation plate is coupled to the first motor for rotation in a plane opposing the stationary base when the first motor is operated. A tilt plate is hingedly coupled to the rotation plate along a tilt axis. An articulating arm is coupled to the tilt plate. A second motor is fixedly mounted to the rotation plate for rotation therewith. The second motor is coupled to the articulating arm such that the articulating arm causes the tilt plate to rotate through a tilt angle about the tilt axis and relative to the rotation plate when the second motor is operated.

13 Claims, 2 Drawing Sheets

ROTATING GIMBAL SYSTEM

ORIGIN OF THE INVENTION

The invention described herein was made by an employee of the United States Government and may be manufactured and used by or for the Government of the United States of America for governmental purposes without the payment of any royalties thereon or therefore.

BACKGROUND OF THE INVENTION

1. Field of the Invention

This invention relates to gimbals. More specifically, the invention is a rotating gimbal system that is compact.

2. Description of the Related Art

Satellites typically use small electric thrusters for position control of a satellite while the satellite is in orbit. Changes in satellite position generally require precise directional control of the thrusters that can be provided by gimbal systems to which the thrusters are mounted. Accordingly, the gimbal systems must be able to make small and precise movements. Further, since size and weight are critical attributes of any space vehicle system, the size and weight of a thruster's gimbal system is ideally minimized.

SUMMARY OF THE INVENTION

Accordingly, it is an object of the present invention to provide a gimbal system.

Another object of the present invention is to provide a compact gimbal system that can provide precise movements with a minimal number of components.

Other objects and advantages of the present invention will become more obvious hereinafter in the specification and drawings.

In accordance with the present invention, a gimbal system includes a stationary base having a planar surface. A first motor is coupled to the stationary base. A rotation plate is coupled to the first motor for rotation in a plane opposing the planar surface of the stationary base when the first motor is operated. A tilt plate is hingedly coupled to the rotation plate along a tilt axis. An articulating arm is coupled to the tilt plate. A second motor is fixedly mounted to the rotation plate for rotation therewith. The second motor is coupled to the articulating arm such that the articulating arm causes the tilt plate to rotate through a tilt angle about the tilt axis and relative to the rotation plate when the second motor is operated.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
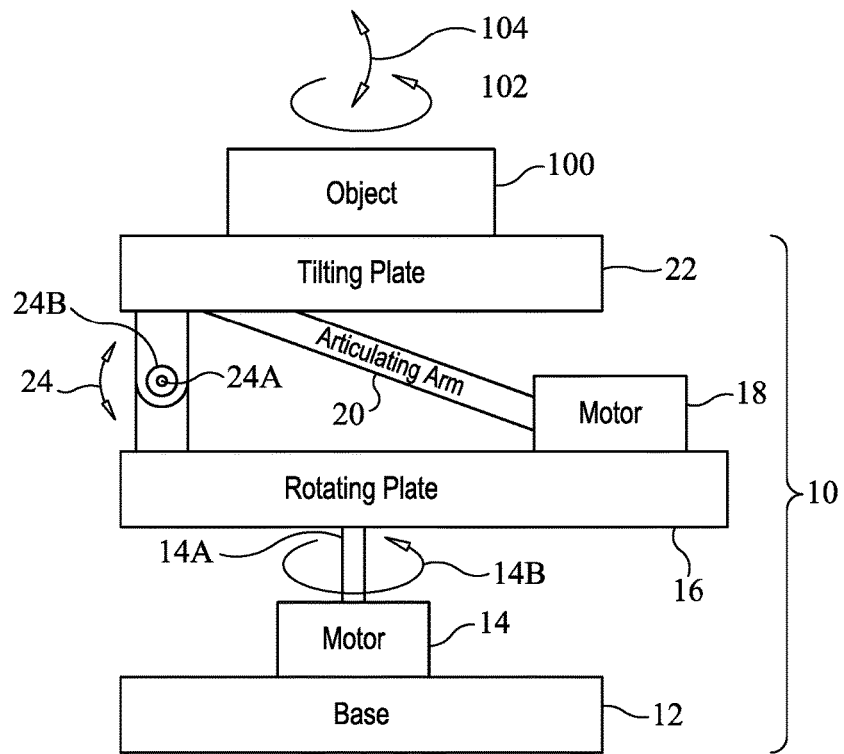
FIG. 1 is a schematic view of a rotating gimbal system in accordance with an embodiment of the present invention.

Referring now to the drawings and more particularly to FIG. 1, a rotating gimbal system in accordance with an embodiment of the present invention is shown and is referenced generally by numeral 10. In general, rotating gimbal assembly 10 is a stacked and compact arrangement of elements that can be realized in a variety of ways without departing from the scope of the present invention. By way of an illustrative example, one such realization of rotating gimbal system 10 will be illustrated and described later herein with reference to FIGS. 2-3 where the compact and minimal-element design is well-suited for the support and positioning of an electric thruster used on satellites.

Rotating gimbal system 10 includes a stacked arrangement of base 12, a first motor 14, a rotating plate 16, a second motor 18, an articulating arm 20, and a tilting plate 22. Base 12 is any rigid and stationary support providing support for the remaining elements of rotating gimbal system 10. Base 12 can be a stand-alone element or could be representative of a portion of a larger structure/system on which rotating gimbal system 10 is mounted. Motor 14 is fixedly coupled to base 12. Motor 14 has a drive shaft 14A that rotates (as indicated by rotational arrow 14B) when motor 14 is operated.

Rotating plate 16 is a rigid plate supported by motor 14 via its drive shaft 14A. That is, rotating plate 16 is coupled to drive shaft 14A such that, when first motor 14 is operated, rotating plate 16 rotates relative to base 12 in accordance with rotation 14B of drive shaft 14A. For example, rotating plate 16 can be rotated in a rotational plane that is parallel to a planar surface 12A of base 12 that serves as the mounting location for first motor 14.

Second motor 18 is fixedly coupled to rotating plate 16 such that second motor 18 rotates in correspondence with the rotation of rotating plate 16 that is in correspondence with rotation 14B of first motor 14. Tilting plate 22 is coupled to rotating plate 16 at a hinge 24. More specifically, hinge 24 defines an axis 24A such that, when tilting plate 22 is rotated about axis 24A (as indicated by rotational arrow 24B), tilting plate 22 is rotated through a corresponding tilt angle relative to rotating plate 16.

To control rotation 24B, articulating arm 20 is coupled to second motor 18 and tilting plate 22. When second motor 18 is operated, articulating arm 20 transfers the mechanical energy produced by second motor 18 to tilting plate 22 whereby rotation 24B results. An object 100 to be positioned by rotating gimbal system 10 is rigidly coupled to tilting plate 22. In this way, rotation 14B of first motor 14 translates into corresponding rotation 102 of object 100, while rotation 24B at hinge 24 translates into corresponding tilting 104 of object 100.

Figure 2:
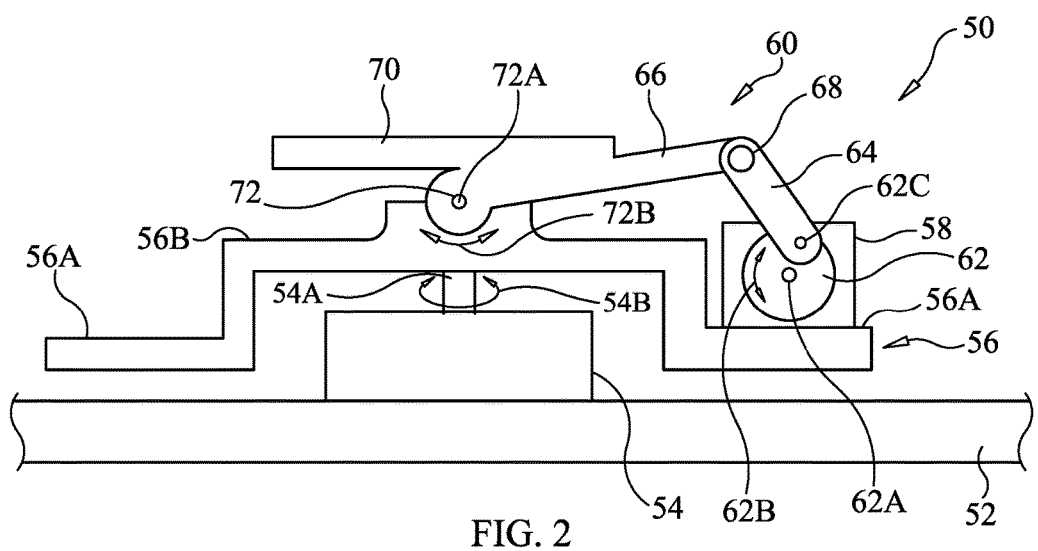
FIG. 2 is a side view of a rotating gimbal assembly in accordance with an embodiment of the present invention.
Figure 3:
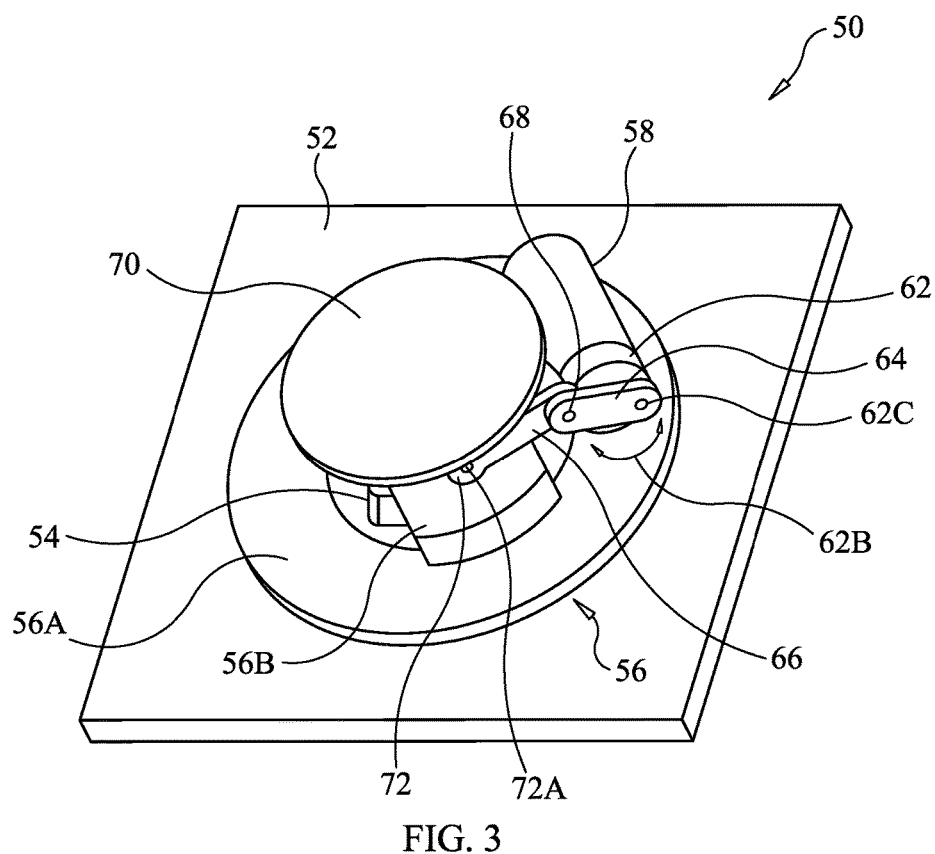
FIG. 3 is a top perspective view of the rotating gimbal assembly illustrated in FIG. 2.

With simultaneous reference to FIGS. 2-3, an exemplary embodiment of the above-described rotating gimbal system is shown and is referenced generally by numeral 50. Rotating gimbal system 50 includes a base 52, a first motor 54, a rotating plate 56, a second motor 58, an articulating arm assembly referenced generally by numeral 60, and a tilting plate 70. First motor 54 is fixedly coupled to base 52. Rotating plate 56 has an outer ring 56A in a first plane and a mounting bridge 56B coupled to and spanning outer ring 56A in a second plane parallel to the first plane defined by outer ring 56A. The drive shaft 54A of first motor 54 is coupled to bridge 56B such that rotating plate 56 is supported for rotation 54B over base 52 by first motor 54. Fixedly coupled to outer ring 56A is second motor 58 such that second motor 58 rotates in correspondence with rotating plate 56.

Articulating arm assembly 60 includes a rotating element 62, a first arm 64 coupled to rotating element 62, and a second arm 66 coupled to first arm 64 and tilting plate 70. More specifically, rotating element 62 is coupled to second motor 58 such that, when second motor 58 is operated, rotating element 62 is driven to rotation 62B about the rotating element's axis 62A. First arm 64 is a rigid element that is hingedly coupled on one end thereof to rotating element 62 at a location 62C that is offset from axis 62A, i.e., at an eccentric location on rotating element 62. Second arm 66 is rigidly coupled (or integrated with) at one end thereof to tilting plate 70. The outboard ends of first arm 64 and second arm 66 are hingedly coupled at a hinge 68. In this way, rotation 62B of rotating element 62 causes articulation of arm assembly 60 as location 62C is in eccentric rotation about axis 62A.

Tilting plate 70 is coupled to bridge 56B of rotating plate 56 at a hinge 72 having an axis 72A such that, when tilting plate 70 is rotated about axis 72A (as indicated by rotational arrow 72B), tilting plate 70 is rotated through a corresponding tilt angle relative to rotating plate 56. Rotation 72B is caused by the above-described articulating movement of articulating arm assembly 60.

The advantages of the present invention are numerous. The stacked and compact arrangement of elements make the rotating gimbal system ideally suited for applications having size and weight constraints. Only a few elements are required to generate simultaneous rotation and angular motion. When coupled with feedback control, the two-motor design will provide precise movements needed for high-precision positioning applications.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A gimbal system, comprising:
   a stationary base having a planar surface;
   a first motor coupled to said stationary base;
   a rotation plate coupled to said first motor for rotation in a plane opposing said planar surface of said stationary base when said first motor is operated;
   a tilt plate hingedly coupled to said rotation plate along a tilt axis;
   an articulating arm coupled to said tilt plate; and
   a second motor fixedly mounted to said rotation plate for rotation therewith, said second motor coupled to said articulating arm wherein said articulating arm causes said tilt plate to rotate through a tilt angle about said tilt axis and relative to said rotation plate when said second motor is operated.

2. A gimbal system as in claim 1, wherein said planar surface of said stationary base is parallel to said plane in which said rotation plate rotates.

3. A gimbal system as in claim 1, wherein said first motor is positioned between said stationary base and said rotation plate.

4. A gimbal system as in claim 1, wherein said rotation plate is supported by first motor.

5. A gimbal system as in claim 1, wherein said articulating arm comprises:
   a rotating element coupled to said second motor for rotation about an axis when said second motor is operated;
   a first rigid arm having a first end rigidly coupled to said tilt plate, said first rigid arm having a second end; and
   a second rigid arm having a first end hingedly coupled to said rotating element at a location on said rotating element offset from said axis, said second rigid arm having a second end hingedly coupled to said second end of said first rigid arm.

6. A gimbal system, comprising:
   a stationary base having a planar surface;
   a first motor coupled to said stationary base;
   a rotation plate coupled to and supported by said first motor relative to said stationary base, said rotation plate rotating in a plane opposing and parallel to said planar surface of said stationary base when said first motor is operated;
   a tilt plate hingedly coupled to said rotation plate along a tilt axis;
   an articulating arm having one end coupled to said tilt plate; and
   a second motor fixedly mounted to said rotation plate for rotation therewith, said second motor coupled to another end of said articulating arm wherein said articulating arm causes said tilt plate to rotate through a tilt angle about said tilt axis and relative to said rotation plate when said second motor is operated.

7. A gimbal system as in claim 6, wherein said first motor is positioned between said stationary base and said rotation plate.

8. A gimbal system as in claim 6, wherein said articulating arm comprises:
   a rotating element coupled to said second motor for rotation about an axis when said second motor is operated;
   a first rigid arm having a first end rigidly coupled to said tilt plate, said first rigid arm having a second end; and
   a second rigid arm having a first end hingedly coupled to said rotating element at an eccentric location on said rotating element offset from said axis, said second rigid arm having a second end hingedly coupled to said second end of said first rigid arm.

9. A gimbal system, comprising:
   a stationary base having a planar surface;
   a first motor coupled to said stationary base;
   a rotation plate coupled to said first motor, said rotation plate rotating in a plane opposing said planar surface of said stationary base when said first motor is operated;
   a tilt plate hingedly coupled to said rotation plate along a tilt axis;
   a second motor fixedly mounted to said rotation plate, wherein said second motor moves in correspondence with said rotation plate;
   a rotating element coupled to said second motor for rotation about an axis when said second motor is operated;
   a first rigid arm having a first end rigidly coupled to said tilt plate, said first rigid arm having a second end; and
   a second rigid arm having a first end hingedly coupled to said rotating element at an eccentric location on said rotating element offset from said axis, said second rigid arm having a second end hingedly coupled to said second end of said first rigid arm, wherein said tilt plate rotates through a tilt angle about said tilt axis and relative to said rotation plate when said second motor is operated.

10. A gimbal system as in claim 9, wherein said planar surface of said stationary base is parallel to said plane in which said rotation plate rotates.

11. A gimbal system as in claim 9, wherein said first motor is positioned between said stationary base and said rotation plate.

12. A gimbal system as in claim 9, wherein said rotation plate is supported by first motor.

13. A gimbal system as in claim 9, wherein said first end of said first rigid arm is integrated with said tilt plate.

\* \* \* \* \*